Feb. 4, 1958 W. F. KING 2,821,858
BALANCING MACHINE
Filed May 12, 1954 10 Sheets-Sheet 1

INVENTOR
William F. King
BY L. D. Burch
ATTORNEY

Feb. 4, 1958 W. F. KING 2,821,858
BALANCING MACHINE

Filed May 12, 1954 10 Sheets-Sheet 4

INVENTOR
William F. King
BY L. D. Burch
ATTORNEY

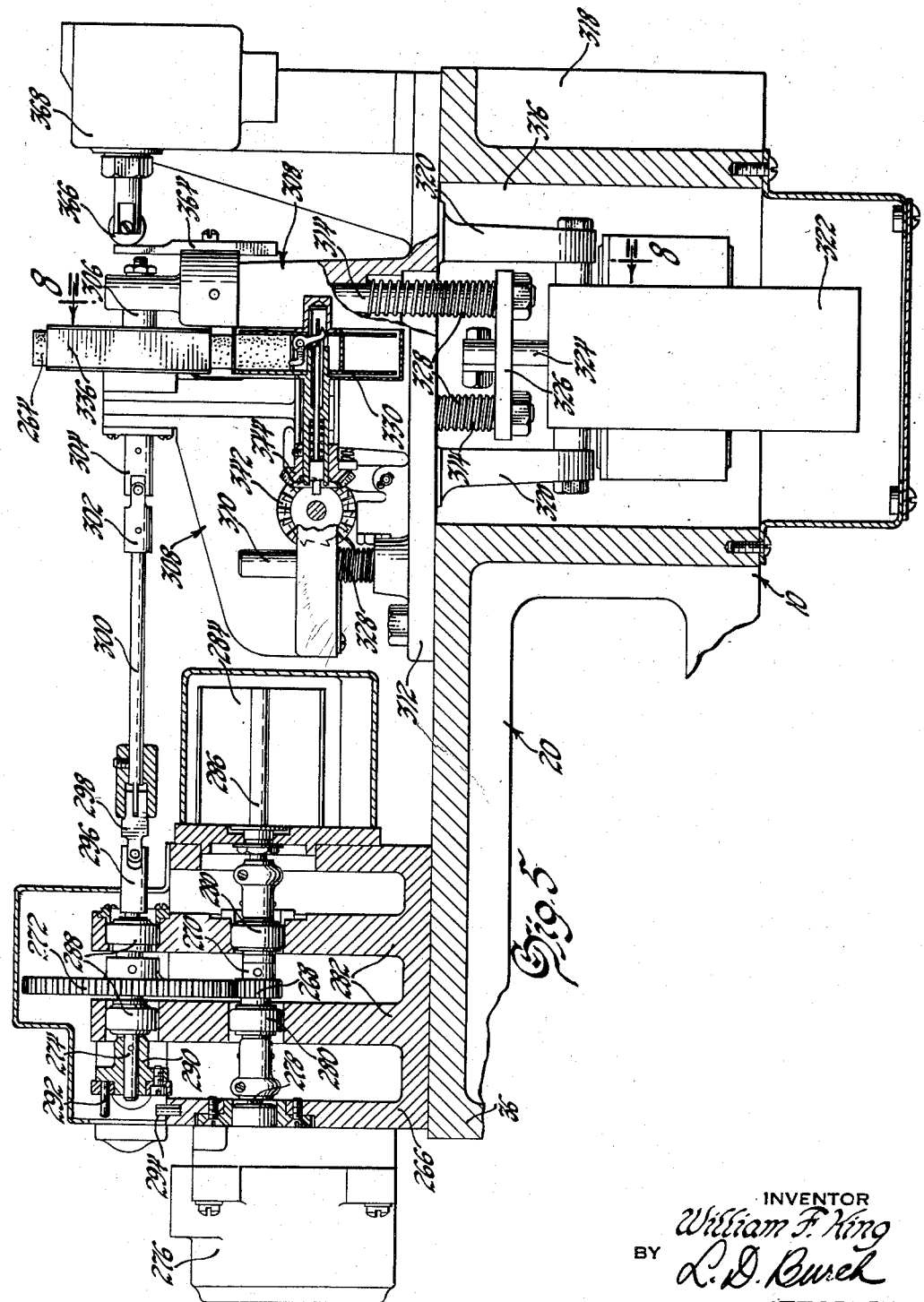

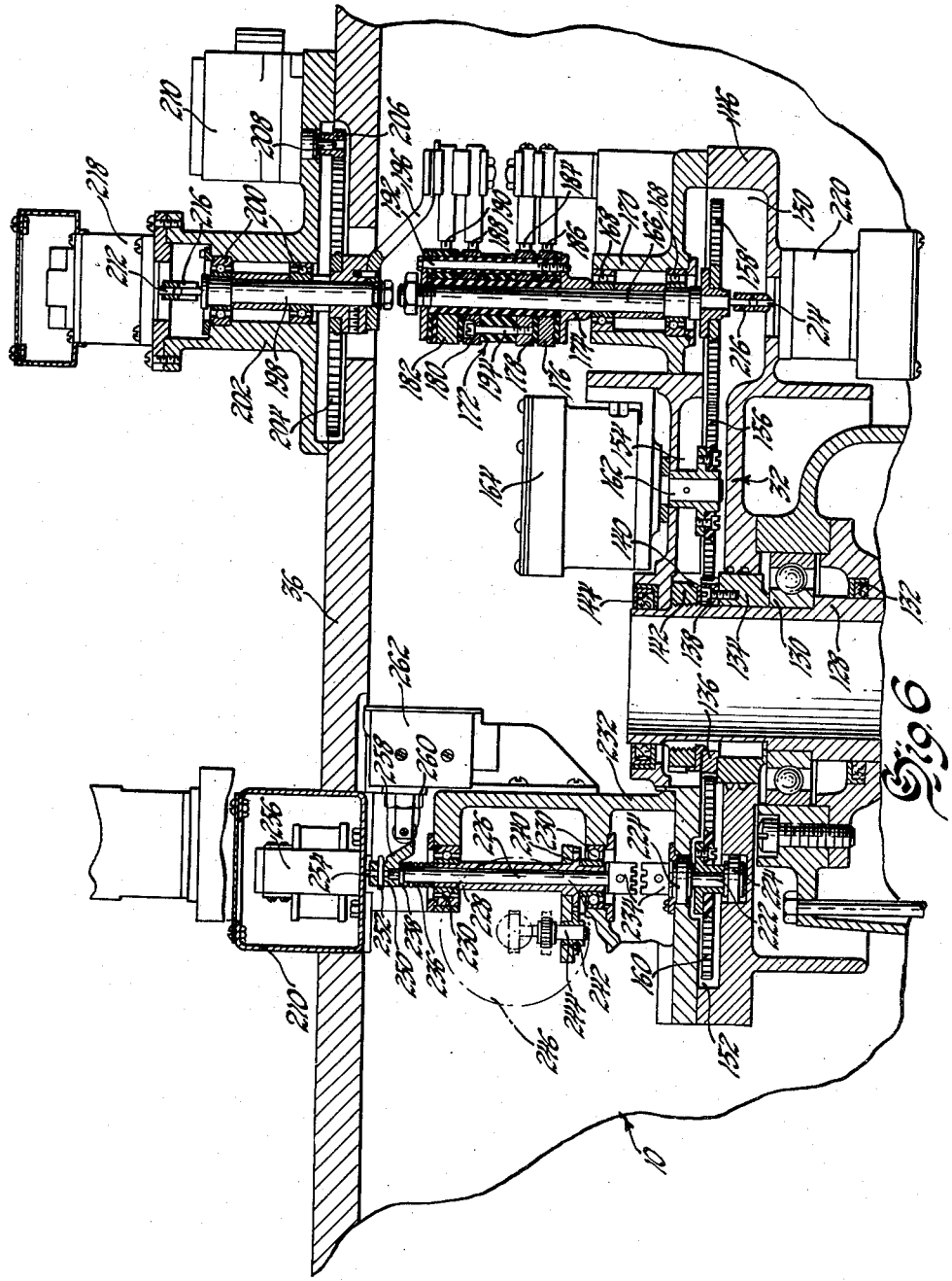

Feb. 4, 1958    W. F. KING    2,821,858
BALANCING MACHINE
Filed May 12, 1954    10 Sheets-Sheet 7
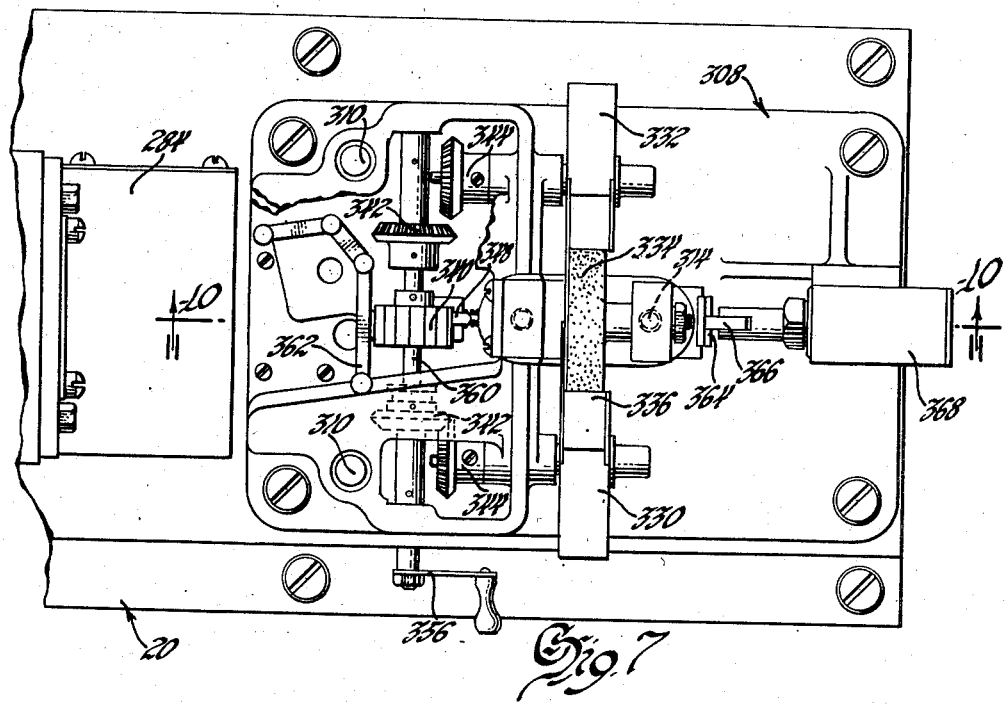
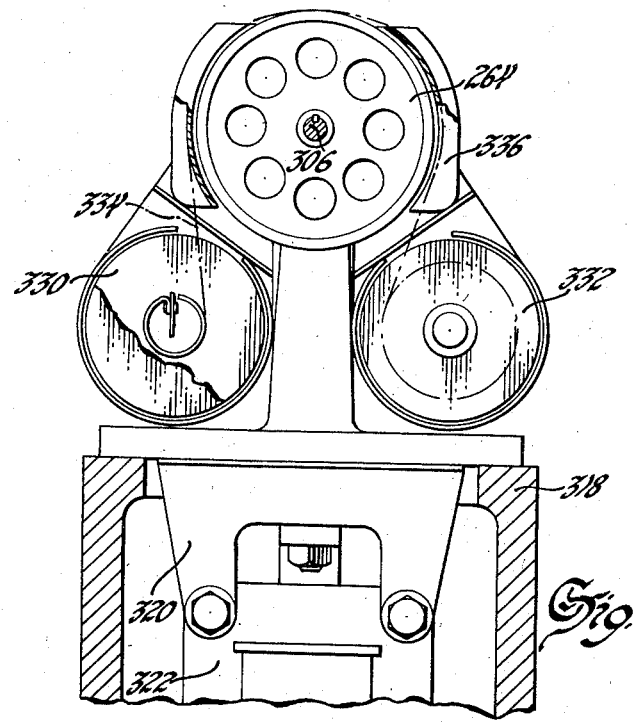
INVENTOR
William F. King
BY
L. D. Burch
ATTORNEY Feb. 4, 1958

W. F. KING 2,821,858

BALANCING MACHINE

Filed May 12, 1954

Inventor
William F. King
By
L. D. Burch
Attorney

Feb. 4, 1958 W. F. KING 2,821,858
BALANCING MACHINE
Filed May 12, 1954 10 Sheets-Sheet 10
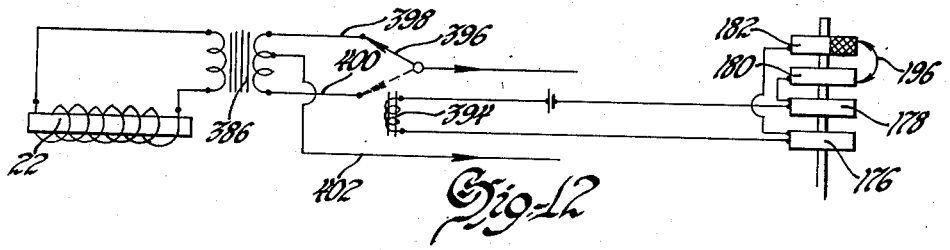
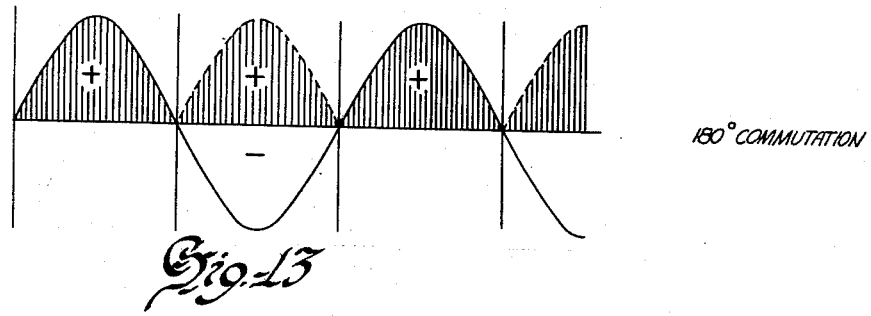
180° COMMUTATION
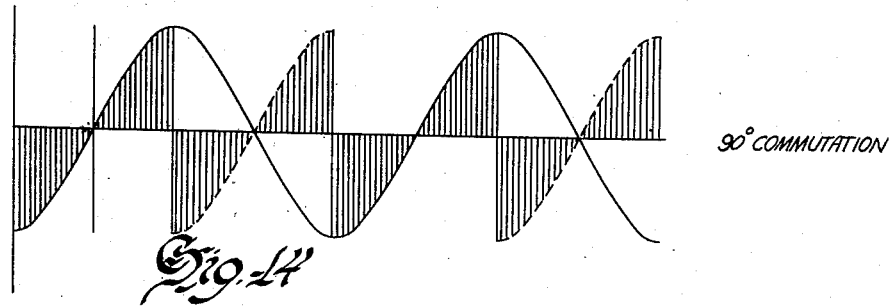
90° COMMUTATION
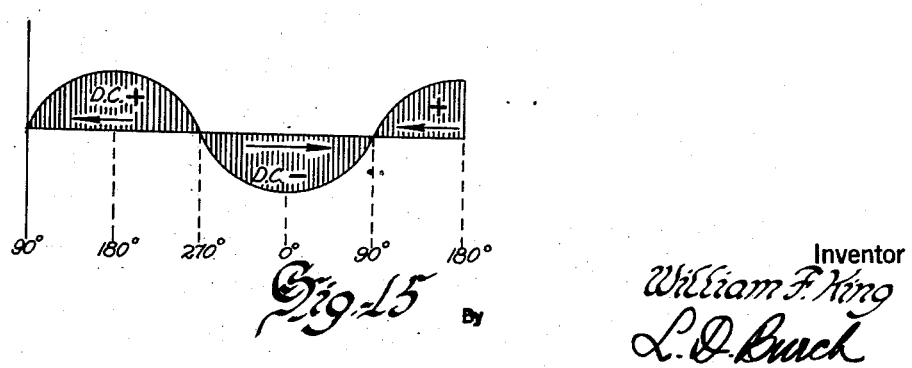
Inventor
William F. King
L. D. Burch
Attorney United States Patent Office 2,821,858
Patented Feb. 4, 1958

2,821,858

BALANCING MACHINE

William F. King, Oak Park, Mich., assignor to General Motors Corporation, Detroit, Mich., a corporation of Delaware Application May 12, 1954, Serial No. 429,146

9 Claims. (Cl. 73—462)

This invention relates to balancing machines and more particularly to machines for balancing a rotary element such as a vehicle wheel or the like.

Machines for balancing vehicle wheels which have been used heretofore have enabled balancing such wheels while mounted on a vehicle or separated therefrom. Such machines generally require either rotating the wheel and determining eccentricity characteristics or allowing the wheel to seek a motionless tilted or at rest position. Such methods require appreciable time, both in rotating the wheel or allowing it to seek a motionless position as well as in determining the amount of unbalance and making the necessary correction. Such methods also require a certain amount of trial and error which in turn calls for a semi-skilled mechanic. Mass production procedures now employed in vehicle assembly require that the vehicle wheels be accurately balanced and corrections made in a minimum of time in order that such operations may be co-ordinated with the vehicle production line.

It is now proposed to provide a wheel balancing machine which is fully automatic in balancing and marking a wheel for correction. This machine is adapted to receive a vehicle wheel upon a spindle, to rotate the wheel, determine the amount of unbalance and angular location thereof, reposition the wheel, and to mark the wheel at the position of unbalance with the corrective weight required. The time involved is reduced to a minimum in that the machine need rotate the wheel only a few turns, the unbalance computations are rapidly and accurately made by the machine and the machine is adapted to mark the wheel at the precise point of correction with the exact weight to be added or eliminated to achieve balance. The machine may be used with a single operator whose sole task is to make the corrections dictated by the machine or may be used with another machine adapted to make the corrections called for.

The amplitude and angular position of unbalance of a rotary member is determined during the rotation thereof by integrating or commutating a pick-up or unbalance signal, utilizing the resultant signal to position the commutator brush rig so as to nullify the unbalance signal, stopping the rotor, and then automatically repositioning the rotor to move the commutator slip rings into the previously determined relation with respect to the brush rig, thereby locating the unbalance of the rotor over a marker wheel. The unbalance signal is also simultaneously compared with a reference signal and the resultant discrepancy signal used to rotate a marker wheel and locate the indicia of the amount of unbalance under the rotary member. When the unbalanced part of the rotor is relocated over the marker wheel the rotor is stamped with the corrective weight to be added at the position required to effect a balanced condition.

In the drawings:

Figure 5 is an enlarged cross sectional view of the tire marking assembly.

Figure 6 is an enlarged cross sectional view of a fragmentary portion of the proposed balancing machine showing the phase sensing means and spindle repositioning device.

Figure 7 is a top view of the marker assembly of Figure 5 having parts broken away and shown in cross section.

Figure 8 is a cross-sectional view of the marker assembly of Figure 5 taken in the plane of line 8—8 and viewed in the direction of the arrows thereon.

Figure 12 is a schematic layout of the commutation relay circuit as associated with the pick-up and amplifier devices.

Figure 13 is the commutated wave form for 180° commutation.

Figure 14 is the commutated wave form for 90° commutation.

Figure 15 is a graph or curve of the resultant mean signals obtained for commutation at various angular positions.

Figure 1:
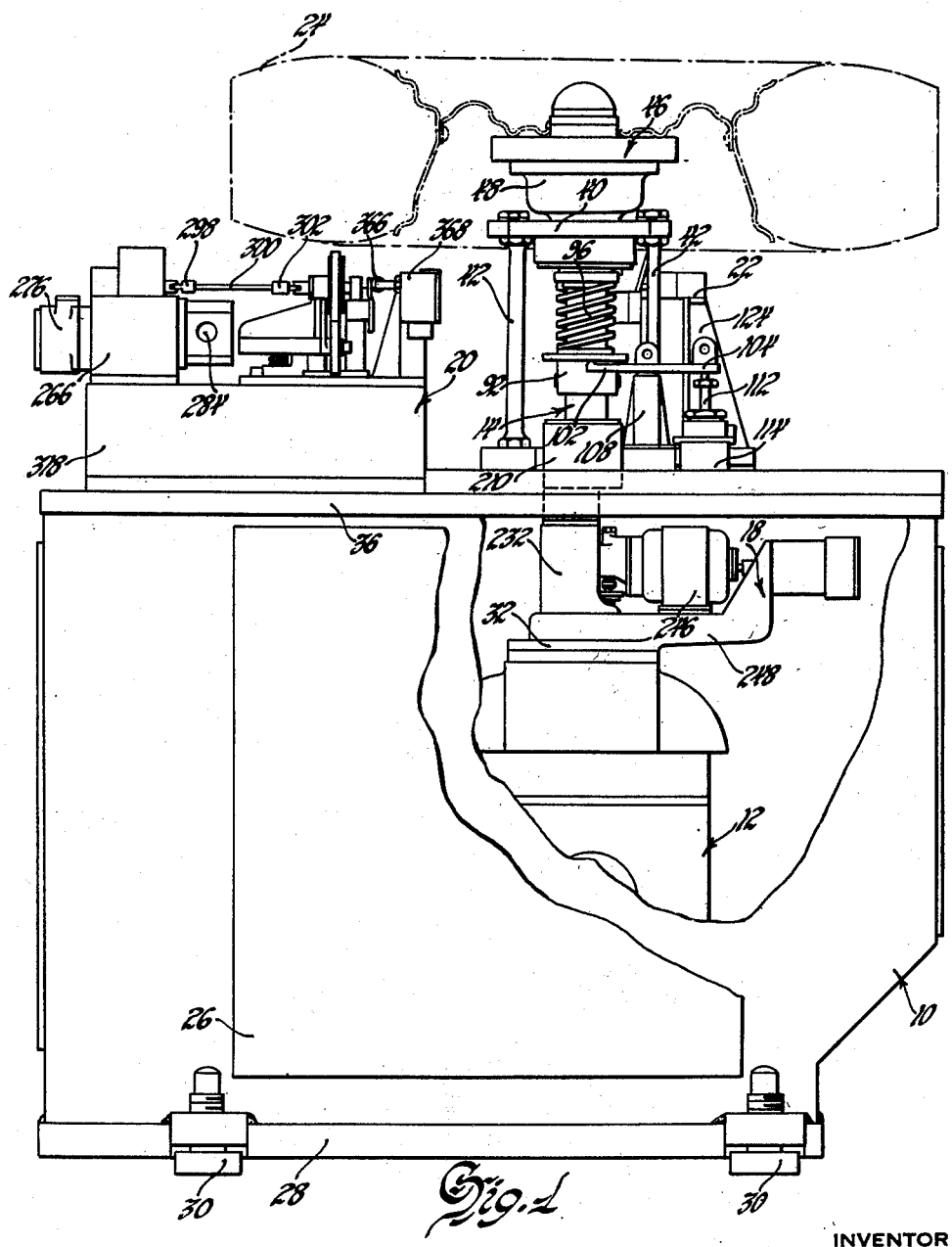
Figure 1 is an end view of the proposed balancing machine having a portion broken away to show certain pertinent features more clearly.
Figure 2:
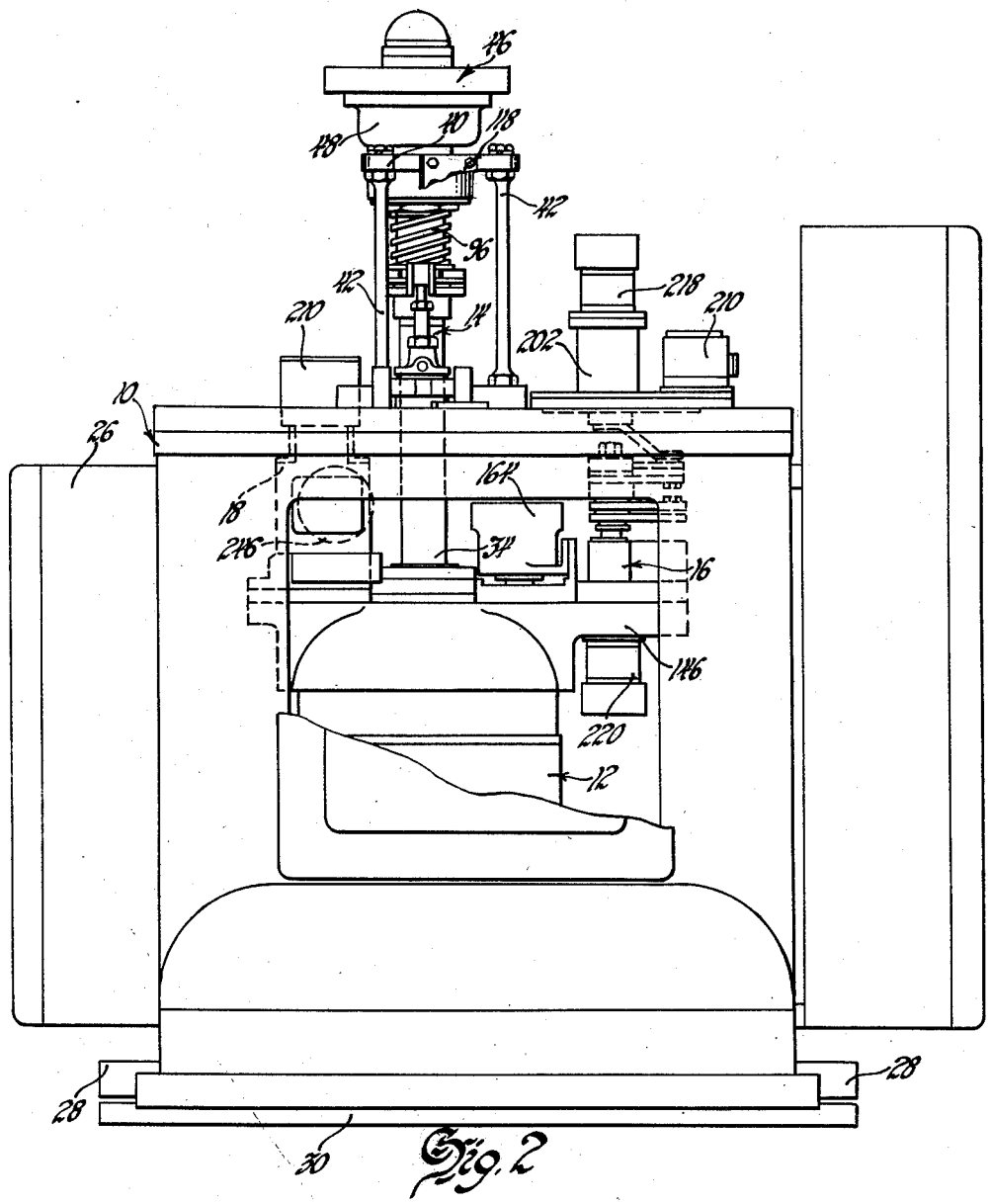
Figure 2 is an end view of the proposed balancing machine.

The balancing machine shown in the drawings includes a housing member 10 within which is disposed a drive motor 12 having a vertical wheel supporting spindle 14, means 16 for detecting the angular disposition of an unbalance force with respect to a vehicle wheel supported on such spindle, and means 18 for repositioning the wheel relative to a marker device 20. An unbalance detector or pick-up device 22 is mounted on the top of the housing 10, as is the marker device 20. The aforementioned units are associated together and with other units hereafter mentioned either mechanically or electrically to enable the detection of an unbalanced force with respect to a vehicle wheel 24 adapted to be associated with the machine and to enable marking the wheel with the corrective measures to be taken to balance such wheel. The electrical switches, relays, circuit breakers and the like incident to this machine are housed within a control box or panel 26 secured to the side of the housing. All wiring has been eliminated from the drawings in order to prevent confusion and is diagrammatically shown in Figure 11 sufficiently to enable those skilled in the art to ascertain the necessary electrical connections required to be made.

The base 28 of the housing member 10 is adapted to be mounted on a floor or other stationary member upon legs 30 having adjustable means for further leveling the machine. The drive motor 12 is vertically mounted within the housing with a platform 32 secured around its uppermost end and below the top of the housing. The unit 16 for detecting the angular location of unbalance is secured to the platform with parts thereof extending through the top of the housing. The spindle repositioning means 18 are similarly mounted on the platform.

Figure 3:
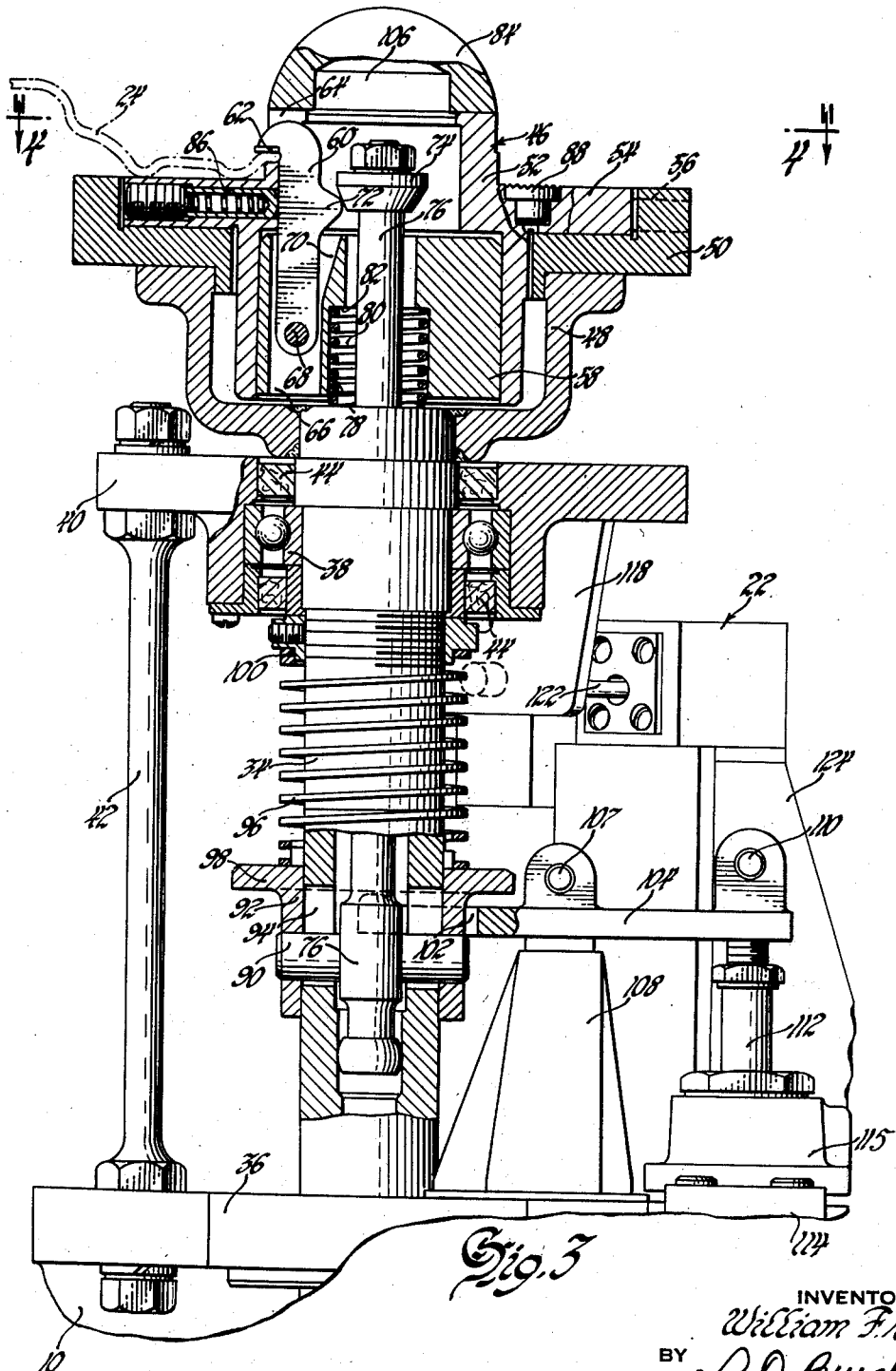
Figure 3 is an enlarged cross sectional view of the wheel support structure.
Figure 4:
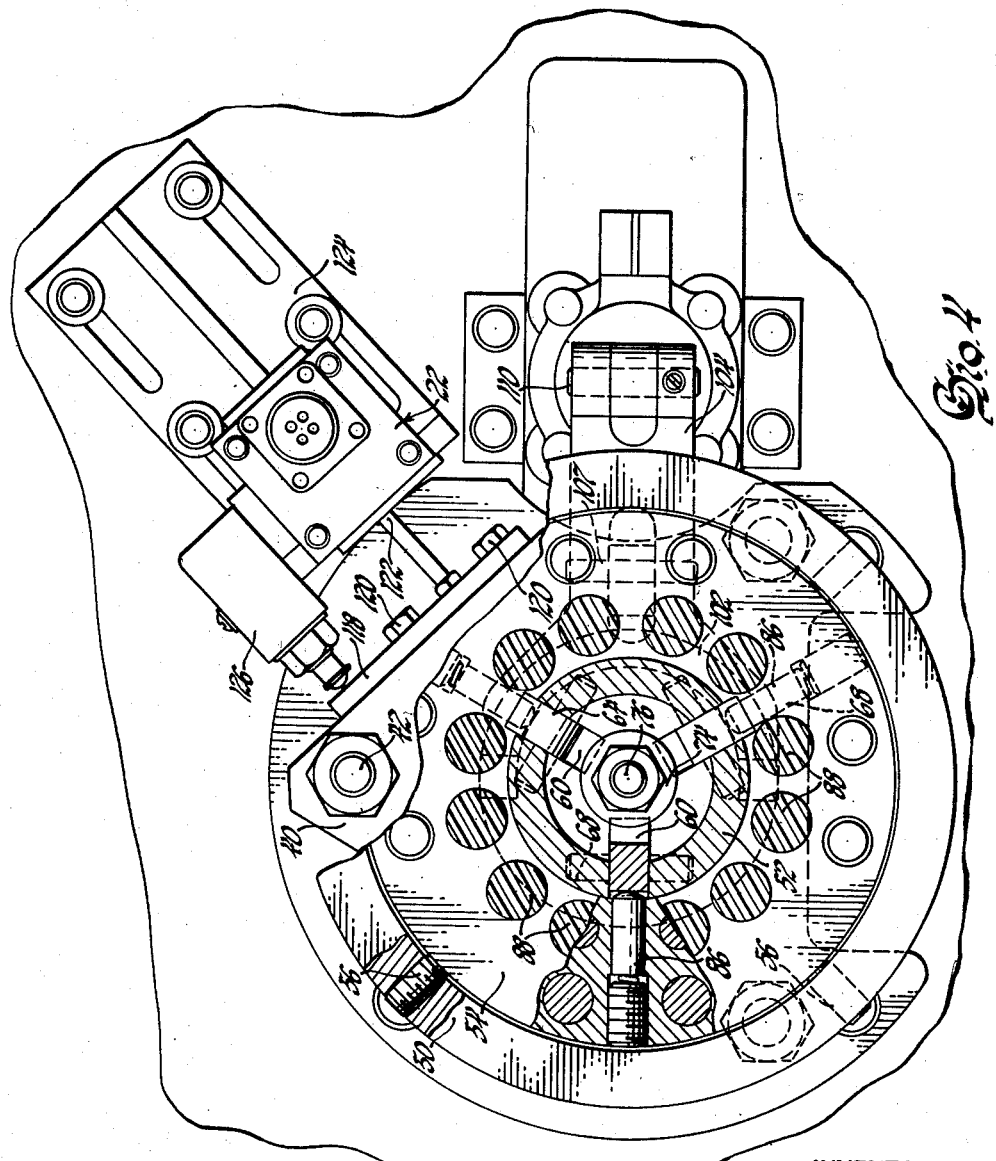
Figure 4 is a cross sectional view taken in the plane of the line 4—4 of Figure 3 and viewed in the direction of the arrows thereon. Portions of Figure 4 have been broken away to show pertinent details more clearly.
Figure 9:
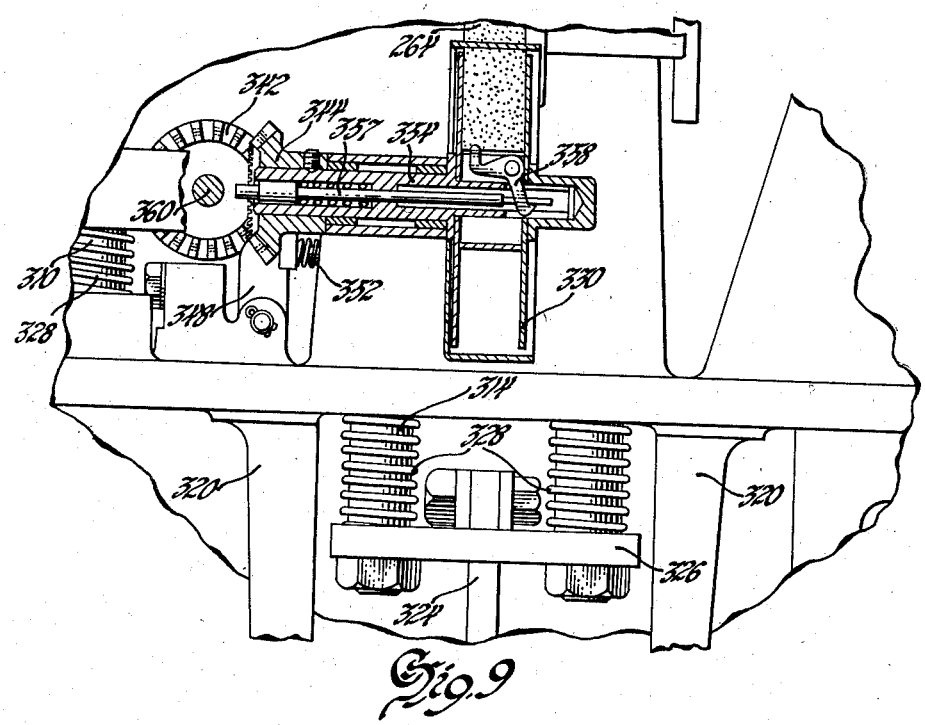
Figure 9 is a fragmentary view of a part of the marker assembly showing the means of rotating the marker ribbon.
Figure 10:
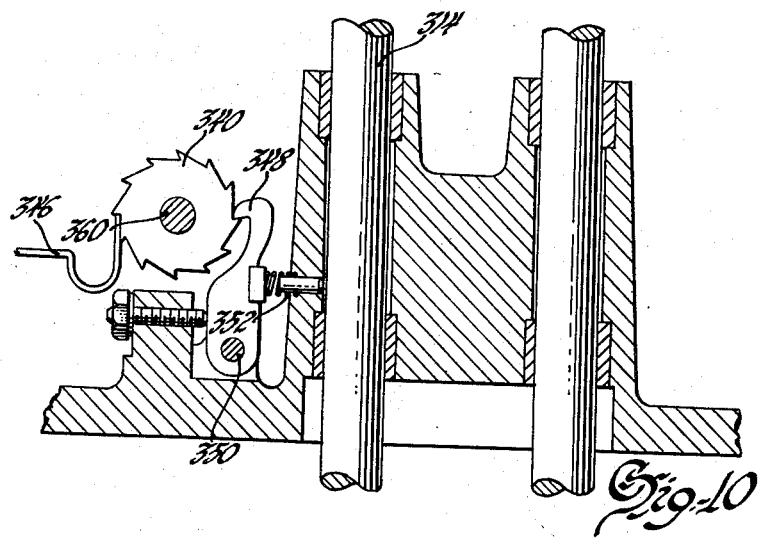
Figure 10 is a cross-sectional view taken in the plane of line 10—10 of Figure 7 and viewed in the direction of the arrows thereon.

Referring to Figure 3, a drive shaft spindle 34 associated with the drive motor 12 extends through the top 36 of the housing 10 and is supported by ball bearing means 38 mounted within a collar 40 held in spaced relation to the table top by three tie rods 42 forming an elastic support for the collar and consequently the end of the drive shaft spindle. Sealing rings 44 are disposed about the shaft 34 on opposite sides of the ball bearing 38.

A wheel supporting member 46 is secured to the uppermost end of the drive shaft spindle 34 and includes a bowl-shaped base portion 48 flanged to receive a retainer member 50 which engages a tubular member 52 adapted to receive the vehicle wheel 24. The tubular member 52 is flanged as at 54 to seat upon the retainer member 50 and is centrally disposed within the bowl-shaped base 48 by set screws 56 radially extended through the sides of the retainer member. Within the tubular member 52 is disposed a cylindrical sleeve 58 having three pivotally mounted pawls 60 each of which has a wheel engaging lip 62 formed at one end and extending through an aperture 64 formed in the side of the tubular member. The pawls 60 are radially disposed circumferentially around the cylindrical sleeve 58 within radial slots 66 formed in the sides thereof and are pivotal about pins 68 extended chordally thereacross. The innermost portion of the radial slots 66 is inclined slightly as at 70 to allow the pawl 60 a greater travel radially inward. Each pawl 60 includes a cam projection 72 on its innermost edge which is adapted to be engaged by a cam nut 74 secured to a pawl actuating rod 76 centrally disposed within the wheel supporting member 46 and upper end of the drive shaft spindle 34.

The cylindrical sleeve 58 has an annular cylindrical recess 78 formed in its inner surface which receives a coil spring 80. The spring bears against the top of the drive shaft spindle 34 and shoulder 82 formed by the recess in the cylindrical sleeve 58 to allow biased axial movement of the cylindrical sleeve and consequently of the pawls 60 within the tubular member 52. A cap 84 is secured over the tubular member 46 to protect the elements disposed therein. Spring loaded detents 86 are provided within the flange 50 of the tubular member 52 and are adapted to urge the pawls 60 radially inward and out of engagement with the vehicle wheel when the cam nut 74 permits. A plurality of grippers 88 are circumferentially disposed about the flange 50 to frictionally engage the portion of the vehicle wheel received thereon and to prevent slippage.

The rod 76 disposed centrally within the wheel supporting member 46 is secured at its lower end by a pin 90 to a sleeve 92 concentric about the drive shaft spindle 34. The sleeve 92 is slidable upon the drive shaft spindle 34 and the cross pin 90 is allowed limited vertical movement within elongated slots 94 formed in the sides of the shaft. The sleeve 92 is biased downwardly by a coil spring 96 extending about the drive shaft spindle 34 between a collar 98 formed on the sleeve and a spring retaining member 100 secured to the shaft thereabove. The rod 76 is axially moved by engagement of the yoke end 102 of a fulcrumed lever arm 104 with the collar 98 of the sleeve 92. The cap 84 is recessed as at 106 to allow axial movement of the rod 76. As the rod 76 is moved to the uppermost position, which is its natural or inoperative position, the detents 86 urge the pawls 60 radially inward. When the vehicle wheel 24 is received upon the wheel supporting member 46 and the rod 76 is moved axially downward, the cam nut 74 at the end of the rod 76 engages the cam projections 72 on the pawls 60 urging the pawls radially outward against the action of the spring loaded detents 86. The wheel engaging lip 62 of each pawl 60 engages the central portion of the wheel 24, holding the wheel to the supporting member 46 and in more secure engagement with the grippers 88. The pawls 60 are allowed limited downward movement by the spring member 80 biasing the pawl retaining cylindrical sleeve 58.

The lever arm 104 is pivotal about a fulcrum pin 107 supported by a webbed bracket 108 secured as by welding to the table top 36. The end of the lever arm 104 is secured by a pin 110 to a plunger 112 of a solenoid 114. As the plunger 112 is moved by the application of air pressure or exclusion thereof the rod 76 is adapted to move the pawls 60 for clamping or releasing the vehicle wheel 24 to the wheel supporting member 46. A limit switch 115 is disposed for actuation by the plunger 112 of solenoid 114 in the course of its reciprocal movement.

A depending plate 118 is secured to one side of the shaft supporting collar 40 as by bolts 120 and is adapted to be engaged, or more properly, utilized by a pick-up device 22 disposed adjacent thereto. The pick-up device 22 is a conventional displacement instrument having a probe 122, which in this instance is connected to the depending plate 118, associated with magnetic means which are made to oscillate within an electrical coil. Reference is made to "Mechanical Vibrations" by Den Hartog, pages 78 and 79, a 1940 publication. The pick-up device 22 is mounted upon a pedestal support 124 adjacent the depending plate 118 and is linearly adjustable relative to the plate. A limit stop 126 is secured to the pick-up device 22 to prevent excess deflection of the collar 40 caused by wheel unbalance such as might damage the pick-up device.

Referring now to Figure 6 the shaft 128 of the drive motor 12 is hollow and is adapted to support the drive shaft spindle 34 therein in a universal joint drive connection at the bottom end of motor. The end of the drive shaft 128 is supported within bearing means 130 and is provided with a sealing ring 132 therebelow. The platform 32 which is secured to the upper end of the motor housing is adapted to receive the drive shaft 128 therethrough. An adapter ring 134 is keyed to the drive shaft 128. An annular gear ring 136 is secured about the shaft 128 and to the adapted ring 134 as by machine screws 138 and is further secured to the shaft by a lock washer 140 and a lock nut 142 threaded about the shaft. The uppermost end of the shaft 128 is provided with a sealing ring 144 to protect the gear mechanism and bearing surfaces disposed therebelow.

The platform 32 is formed as a gear housing 146 and has gear chambers 150, 152 and 154 wherein a transfer gear 156, slip ring spindle gear 158, and a repositioning spindle gear 160 are respectively disposed. The transfer gear 156 is secured to a rotatable shaft 162 extending from a zero speed switch 164 secured to the platform 32 and is disposed in mating engagement with the drive shaft gear 136 and the slip ring spindle gear 158. The zero speed switch is such as is shown on page 15 of General Electric pamphlet GEC–1260 "General Purpose Control" of August 1954. The latter gear 158 is secured to the slip ring spindle 166 which is rotatably mounted within bearings 168 secured within a supporting cylindrical column 170 formed from the platform. A slip ring assembly 172 is secured to the upper end of the spindle 166 upon a slip ring assembly collar 174. The slip ring assembly 172 includes three continuous slip rings 176, 178 and 180 and a split ring 182. The lowermost two rings 176 and 178 are slidably engaged by stationary brushes 184 and 186 secured to the platform and the uppermost rings 180 and 182 are similarly engaged by movable brushes 188 and 190. Tie bolt 192 holds the slip rings and insulators assembled with bolt means 194 connecting rings 178 and 180 and other similar bolt means (not shown) connecting rings 176 and 182.

The movable brushes 188 and 190 are secured to a travel arm 196 which is itself secured to a shaft 198 axially aligned with the slip ring spindle 166 and rotatably mounted directly thereabove. The shaft 198 is mounted within bearing means 200 provided within a shaft housing 202 secured to the top 36 of the housing 10 and extends through an opening formed through the top of the housing. A gear member 204 is secured to the shaft 198 and is in meshing engagement with a drive gear 206 mounted upon the shaft 208 of a drive motor 210 secured to the top 36 of the housing adjacent the shaft housing 202. The shaft 198 and spindle 166 are each separately connected to rotatable shafts 212 and 214 respectively by collars 216 which protrude from control transformers 218 and 220. The one control transformer 218 is secured over the shaft housing 202 and the other 220 beneath the platform 32. The control transformers 218 and 220 are commercially available units which will be hereinafter mentioned in more detail.

The gear ring 136 of the motor drive shaft 128 also meshes with the repositioning gear 160 secured to a stub shaft 222 which is mounted for rotation within bearing means 224 provided within the platform 32. An axially movable and rotatable shaft 226 is keyed within a sleeve 228 supported by bearing means 230 provided within a support member 232 therefore which member is secured to the platform 32 and adapted to dispose the shaft 226 axially over the stub shaft 222. The ends of the stub shaft 222 and shaft 226 are provided with clutch members 234 having interlocking teeth adapted to be engaged together upon downward axial movement of the shaft 226. A spring 236 abutting against the sleeve 228 and a spring collar 238 secured to the shaft 226 is adapted to bias the shaft in a raised position. The sleeve 228 is formed to provide a gear portion 240 meshing with a drive gear 242 which is mounted upon the shaft 244 of a drive motor 246, hereafter referred to as the spindle repositioning drive motor, which is supported upon a base member 248 secured to the platform as shown more clearly in Figure 1.

The upper end of the shaft 226 is rotatable within an end bearing member 250 secured as by cotter pin 252 to an actuating element or probe 254 extending from a solenoid 256. The solenoid 256 is secured to the top 36 of the housing 10 axially over the shaft 226. The end bearing member 250 is provided with a cam surface 258 which engages a cam follower 260 associated with a limit switch 262 which switch is secured to the support member 232.

The tire marking device 20 is secured to the top 36 of the housing 10 with the striker wheel 264 disposed beneath the tire portion of the vehicle wheel 24 being balanced. The striker wheel 264 includes embossed indicia of balance correction provided upon its periphery which enables marking the tire assembly being balanced with the corrective measure necessary as will be explained. The disposition of the marker device 20 relative to the pick-up device 22 is of no consequence. The unbalance is related to the angular disposition of the spindle 14 as designated by the disposition of slip ring assembly 172 and such spindle disposition is then related to the location of the marker means to determine the relative relation of the unbalance to the marker means. The general location of the marking device 20 is shown in Figure 1 with a more detailed view presented in Figure 5.

The tire marker 20 includes a gear housing member 266 within which a drive gear 268 secured to a driven shaft 270 and a driven gear 272 upon a separate shaft 274 are disposed. A drive motor 276 is secured to one end of the gear housing 266 and has its shaft 278 coupled to the driven shaft 270. The driven shaft 270 is journaled within bearing means 280 secured within supporting walls 282 of the gear housing. A potentiometer 284 having a suitable source of direct current voltage which may consist of a dry cell battery 285 or other source, is secured to the gear housing 266 and has the rheostat shaft 286 coupled to the other end of the driven shaft 270. Disposed in parallel relation to the driven shaft 270 and thereabove is shaft 274 having the driven gear 272 secured thereto. Shaft 274 is journaled within bearing means 288 provided in the walls 282 and has a collar 290 secured to one end and provided with a peg 292 which is adapted to engage a stop 294 for limiting the rotational travel of the shaft 274. Universal coupling members 296 and 298 are secured to the other end of the shaft 274 with the outermost coupling member 298 slidably engaged with an extension rod 300. The extension rod 300 is axially movable relative to the shaft 274 and at the same time is rotatable with the shaft. The other end of the extension rod 300 is connected by universal coupling members 302 and 304 to the striker wheel shaft 306 which has the striker wheel 264 secured thereto. The striker wheel is marked on its periphery by embossed indicia of balance correction which may be the weight to be added or removed, a drill depth, length of corrective slug, or other indicia dependent upon the particular type of correction to be made.

The striker wheel shaft 306 is journaled within bearing means mounted in the striker wheel carriage assembly 308. The carriage assembly 308 is vertically movable upon the guide rods 310 which are secured to the base plate 312 and guide rods 314 which are secured to the carriage assembly 308 and are slidable through the base plate 312. The base plate 312 is secured over an opening 316 provided in the support stand 318 and has hangers 320 secured thereto and projected through the opening to support a solenoid 322. The plunger 324 of the solenoid is secured to a cross-arm 326 which itself is secured to the ends of the guide rods 314. Coil springs 328 are disposed about the guide rods 314 for biasing the cross-arm 326 downwardly and are provided about the other guide rods 310 to cushion the downward movement of the carriage assembly 308 against the base member 312. Actuation of the solenoid 322 is adapted to move the carriage assembly 308 upwardly upon the guide rods 314 and 310 and cause the striker wheel 264 to engage the tire of the wheel 24 positioned thereabove.

The carriage assembly 308 further includes a pair of spools 330 and 332 which are adapted to retain a marker ribbon 334. The marker ribbon 334 is adapted to pass from one spool 330, over guide track 336 and across the top of the striker wheel 264 to the other spool 332. The ribbon and spool assembly is similar to conventional typewriter ribbon systems and includes a ratchet wheel 340 and bevel gears 342 and 344. The ratchet wheel 340 is engaged by a catch 346 preventing rotation in one direction and a pawl 348, pivoted about a pin 350 and spring biased as at 352, for preventing rotation in the other direction. As the carriage assembly 308 is raised the ratchet wheel 340 moves free of the catch 346 and the pawl 348 will rotate the wheel, moving the bevel gears 342 and in turn the shafts 354 having the bevel gears 344 mounted at one end and the ribbon spool 330 or 332 at the other. The ribbon spools 330 and 332 are also rotatable manually by means of the bell crank lever arm 356. A spring loaded plunger 357 is centrally disposed within the shaft 354 and is adapted to enable moving a small bell crank lever arm 358 mounted in each spool to enable releasing the spool from its shaft. The shaft 360 having the bevel gears 342 and ratchet wheel 340 thereon is axially movable by mechanical linkage 362 to enable engagement of one or the other of the bevel gears 344 for reversal of the travel of the marker ribbon 334.

A cam surfaced member 364 is secured to the carriage 308 and is engaged by a cam follower 366 associated with a limit switch 368. As the carriage assembly 308 is raised the cam follower 366, at a certain lift position, is moved axially by the cam surfaced member 364 actuating the switch 368. The function of this switch 368 will be described in a discussion of the operation of the balancing machine which follows.

Figure 11:
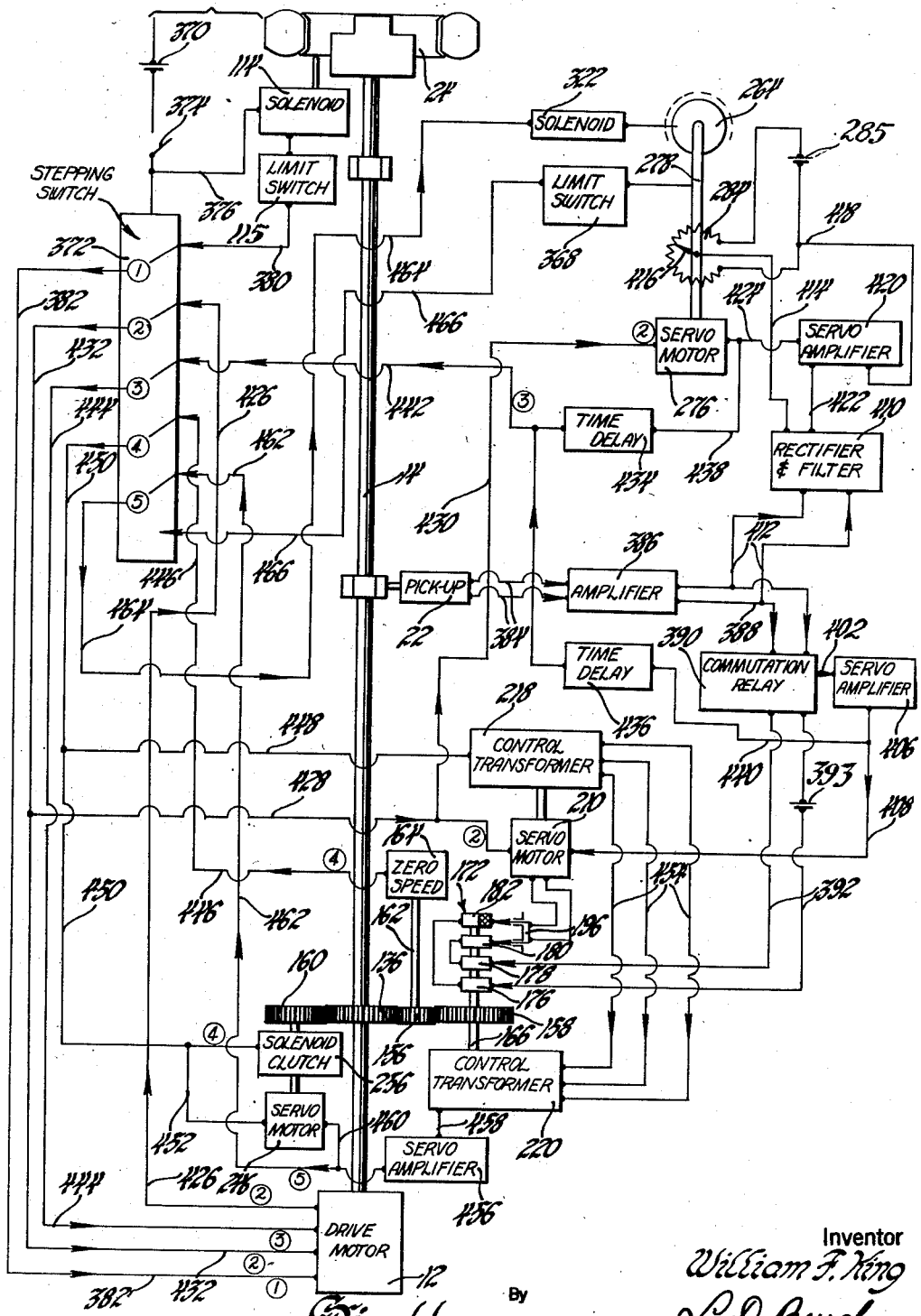
Figure 11 is a diagrammatic sketch of the electrical circuit of the proposed balancing machine showing the elements employed in block form.

Referring to Figure 11 all of the components heretofore described being well known in the art are shown diagrammatically in block form. A source of electrical power 370 is applied to the control panel 26 wherein is disposed a stepping switch 372 such as those employed with telephone and telegraph systems and as are shown and described on pages 2038–39 of the Standard Handbook for Electrical Engineers, seventh edition, McGraw Hill Book Company, 1941. A cutout switch 374 is secured within the line between the power supply source and the stepping switch. Actuation of the switch 374 is adapted to ready the wheel balancing and marking machine for operation.

The vehicle wheel 24 is first placed upon the spindle 14 and the starting switch 374 is then closed energizing the solenoid 114 through the lead 376 to clamp the wheel to the spindle. As the wheel 24 is clamped to the spindle 14 the limit switch 115 is closed sending a pulse of current through the lead 380 to the stepping switch 372 and moving the switch to the No. 1 position. In the No. 1 position current is applied through the lead 382 to the drive motor 12 for driving the motor in the forward direction and causing rotation of the vehicle wheel 24 supported upon the drive spindle 14.

As the motor 12 is rotated the pick-up device 22 receives an unbalance signal from the spindle 14 which signal is passed through the leads 384 to a pick-up amplifier or transformer 386 such as that shown on page 149 of "Theory and Application of Electron Tubes" by Reich, McGraw Hill Book Company, 1944. The amplified pick-up signal or unbalance signal is passed through the lead 388 to the commutation relay 390. At the same time the stationary brushes 184 and 186 engaging the slip rings 176 and 178, which rings are connected to the solid and split rings 180 and 182 respectively convey a square wave reference signal through leads 392 to the commutation relay 390.

Referring to Figure 12 there is shown a diagrammatic layout of the commutation relay 390. A reference signal is applied by a suitable source of direct current voltage such as a dry cell, battery 393 or other source, to a magnetic relay 394 through the stationary brushes 184 and 186 engaging rings 176 and 178 which relay is adapted to alternately actuate a switch arm 396 to engage one or the other of the end leads 398 and 400 of the unbalance signal amplifier or transformer 386 and thereby commutate the unbalance signal; the other output lead 402 being a center tap. The energization of the magnetic relay 394 is dependent upon the rotational position of the split slip ring 182 relative to the movable brushes 188 and 190 on jumper 196.

Given an unbalance signal, commutation each 180°, as in Figure 13, will give a positive resultant signal and with commutation at zero degrees there would be a negative resultant signal. At 90°, as in Figure 14, or 270° there will be no output signal. Commutation thus provides a positive, zero, or negative mean signal dependent upon the brush location, the cumulative possibilities being shown in Figure 15. Consequently a positive resultant or error signal requires that the movable brushes 188 and 190 be advanced in one direction to the 90°, or 270° whichever balance position is selected, while a negative error signal will require that the brushes be moved in an opposite direction to arrive at the balance or zero output position.

The resultant or error signal from the commutation relay 390 is passed through lead 402 to a servo amplifier 406 and on through lead 408 to the servo motor 210 which is adapted to position the movable brushes 188 and 190 relative to the slip rings 180 and 182. A positive signal will cause the brushes 188 and 190 to move in one direction, a negative signal in the opposite direction, until the commutation is such as eliminates the error signal.

Inasmuch as the vehicle wheel 24 and the slip ring assembly 172 are simultaneously rotated at the same speeds and in same direction, via the intermediate gear 156, when the unbalance of the wheel is 90° or 270° away from the pick-up 22 the solid part of the slip ring 182 must at that moment contact the movable brush 190 to complete the relay circuit and commutate the unbalance signal in order to achieve a zero error signal. Having positioned the movable brushes 188 and 190 to arrive at this balance condition the vehicle wheel 24 need later only be repositioned to then move the split slip ring 182 relative to the then positioned movable brush 190 in order to position the unbalance relative to the tire marker assembly 20.

The amplified pick-up signal from the amplifier 386 is also connected to a rectifier and filter circuit 410 via leads 412. The rectifier 410 is a conventional circuit used to obtain unbalance amplitude and such as is shown on page 592 of the "Radio Engineers Handbook" by Terman, McGraw Hill Book Company, 1943. The filter circuit is of the type conventionally used with rectifier output and such as is also shown in the same "Radio Engineers Handbook" on page 228. The pick-up signal from the rectifier and filter circuit 410 is connected by a lead 414 to the movable arm 416 of the potentiometer 284 and is also connected by lead 418 to a conventional servo amplifier 420. The relation of the potentiometer arm 416 to the potentiometer 284 across which it travels determines the amplitude of the signal passed through the lead 418 to the servo amplifier 420 and therein is compared with the amplitude signal from the rectifier 410 introduced through lead 422. As the arm 416 is moved relative to the potentiometer 284 the signal to the servo amplifier 420 is changed until it matches the signal from the rectifier 410. As long as the two signals are in variance an error signal is transmitted to the servo motor 276 through lead 424. The potentiometer arm 416 is connected to the shaft 278 of the servo motor 276 and of the striker wheel 264 so that the servo motor 276 activated by the error signal in positioning the potentiometer arm also positions the striker wheel 264. The movement necessary to position the potentiometer arm 416 so as to match the signal from the rectifier 410 will locate the proper mark on the striker wheel 264 directly beneath the tire of the vehicle wheel 24 disposed above the striker wheel.

As the main drive motor 12 comes up to speed a pulse of current through the lead 426 passes to the stepping switch 372 pulsing the switch to the No. 2 position. This pulse is initiated by a slow closing dashpot type time delay relay or similar means which is preferably disposed in either line 426 or the stepping switch 372 (though not specifically shown in either by the drawings). In the No. 2 position of the stepping switch the two servo motors 210 and 276 are energized through leads 428 and 430 connected to lead 432 energizing the drive motor 12.

The error signal from the commutation relay 390 is connected through the lead 402 to the servo amplifier 406 and through another lead 408 to the servo motor 210. The signal causes the servo motor 210 to move brushes 188 and 190 relative to the rotating slip rings 180 and 182 in one direction when the error signal is positive or in the other direction when negative. Changing the time of commutation reduces the error signal passing to the servo motor 210. Consequently the servo motor 210 will move the brushes until the commutation achieves a zero output signal.

The other servo motor 276, adapted to rotate the potentiometer arm 416 and the striker wheel 264, likewise receives an error signal from its servo amplifier 420 and is adapted to position the striker wheel and potentiometer arm in response to the signal received until the potentiometer arm 416 is properly positioned and there is consequently no error signal passed to the servo motor.

Separate timed delay switches 434 and 436 of the slow closing dashpot type time delay relay or similar type are connected by the leads 438 and 440 between the servo amplifiers 420 and 406 and the servo motors 276 and 210. When there is no error signal passing through the leads 438 or 440 the timed delay switches 434 and 436 are readied and when both switches are so readied, which will be when the respective servo motors 276 and 210 have properly positioned the movable brushes relative to the slip rings 180 and 182 and the striker wheel 264 relative to the vehicle wheel 24, a pulse of current is passed through the lead 442 to the stepping switch 372, stepping the switch to the No. 3 position.

In the No. 3 position of the stepping switch 372 the field of the drive motor 12 is energized through the lead 444 for reverse rotation, thereby causing a braking of the drive motor. As the spindle speed is reduced, the speed of the intermediate gear 156 also approaches zero. At the instant the forward rotation of the spindle 14 ceases the zero speed switch 164 connected to the gear 156 is adapted to send a pulse of current through the lead 446 to the stepping switch 372, shifting the stepping switch to the No. 4 position which at the same time completely cuts out the field of the drive motor 12 and thereby leaves the spindle 14 stationary.

In the No. 4 position of the stepping switch 372 the control transformer 218 is energized through lead 448 connected to lead 450 running to the solenoid clutch 256, and servo motor 246 is energized through lead 452. The control transformers 218 and 220 are such as that commercially known as a "Circuitrol" manufactured by the Kollsman Instrument Division of the Square "D" Company, Elmhurst, New York, and which is illustrated in its "Special Purpose Motors Catalog" of March 1, 1949, pages E–42 to 50. The one control transformer 218 represents the desirable disposition of the split slip ring 182 relative to the marker assembly 20 and the other control transformer 220 represents the actual position of the split slip ring 182 with respect to the marker assembly. Consequently a comparison of the control transformers 218 and 220 via the conductor group 454 produces an error signal, which signal is conveyed to amplifier 456 via lead 458 and passed to the spindle repositioning servo motor 246 via lead 460. The solenoid clutch 256 having engaged the servo motor 246 with the spindle repositioning gear 160, the signal received by the servo motor 246 rotates the wheel supporting spindle 14 and consequently the slip ring spindle 166 thereby moving the slip rings assembly 172 to the desired relation with respect to the location of the marker assembly 20 and at the same time positioning the vehicle wheel 24 relative to the striker wheel 264. When the position of the slip ring assembly 172 relative to the marker assembly 20 corresponds to the desirable condition of the one control transformer 218 there is no signal to the servo motor 246 and the vehicle wheel 24 is consequently stopped with its unbalance directly over the striker wheel 264. The termination of a signal to the servo motor 246 sends a pulse of current through the lead 462 to the stepping switch 372 pulsing the switch to the No. 5 position.

In the No. 5 position of the stepping switch 372 the solenoid 322 associated with the striker wheel carriage assembly 308 is energized through lead 464 causing the carriage assembly to be urged upwardly and the striker wheel 264 to mark the tire of the vehicle wheel 24. As the carriage 308 reaches the maximum upward position wherein the tire of wheel 24 is marked the limit switch 368 associated with the cam surface 364 secured to the movable carriage 308 sends a pulse of current through the lead 466 back to the stepping switch 372 opening the cutout switch 374 de-energizing the solenoid 114 and unclamping the vehicle wheel 24 from the spindle 14. The vehicle wheel 24 is then removed from the spindle 14 and the corrective measures taken as marked on the tire. Another vehicle wheel may be placed upon the spindle 14 and the entire wheel balancing and marking operation repeated.

While the invention has been explained in terms of balancing wheel and tire assemblies, it will be understood by those skilled in the art that the same system is applicable to the balancing of a multitude of parts such as flywheels, clutches, fans, etc. and it is the aim of the appended claims to cover such modifications as fall within the scope of the invention.

I claim:

1. A balancing machine including means for receiving and rotating a member for balance determination, means operatively connected to said first-named means for automatically determining the amplitude of unbalance of said member and the angular disposition of the unbalance thereof relative to said first-named means, means operatively connected to said second-named means and responsive to the amplitude determination made thereby, means for automatically stopping said unbalance member and repositioning said member relative to said amplitude responsive means, said last-named means being operatively connected to said first and said second-named means and including means determinative of the relative angular relation of said unbalance to said first-named means, as determined by said second-named means during rotation of said member, and of said last-named means to said amplitude responsive means at the completion of work rotation and being responsive to said angular determinations for automatically positioning said member relative to said corrective means, said amplitude responsive means being operatively connected to said last-named means for automatic actuation thereby to engage said member upon the relocation of the unbalanced portion of said member relative thereto by said last-named means.

2. A balancing machine including a spindle for supporting a rotary member, means for rotating said spindle, a pick-up device operatively engaging said spindle and adapted to generate an unbalance signal, commutation means operatively connected to said spindle and said pick-up device for receiving and commutating said unbalance signal for producing a resultant error signal, servo control means operatively connected to said commutation means and responsive to said error signal therefrom for relatively relocating parts of said commutation means and thereby reducing said error signal, a marker device provided upon said balancing machine, spindle repositioning means adapted to engage said spindle upon the termination of rotation by said first named spindle rotating means, said repositioning means being operatively connected to said servo control means and responsive thereto for locating the unbalanced portion of said member adjacent said marker device, said marker device being adapted to engage said member at the corrective portion thereof when relocated adjacent thereto.

3. A balancing machine including a spindle adapted to receive an unbalanced member for rotation, means for rotating said spindle, a pick-up device operatively connected to said spindle, means operatively connected to said spindle and said pickup device and determinative of the amplitude and angular location of unbalance with respect to said unbalance member, means responsively connected to said determinative means for stopping the rotation of said spindle upon the determination of the amplitude and angular location of unbalance, a marker assembly operatively connected to said determinative means and responsive to the amplitude determination made thereby, spindle repositioning means operatively connected to said determinative means and responsive to the angular determination made thereby for relocating the unbalanced portion of said member adjacent said marker assembly, and means for actuating said marker assembly for engaging said unbalanced member at the corrective portion thereof upon the relocation of said corrective portion adjacent thereto.

4. A balancing machine including a vertically disposed spindle, means for driving said spindle, means for centrally supporting a rotary member upon said spindle and for securing said member thereto, unbalance detecting means operatively connected to said spindle for producing an unbalance signal, integrating means operatively connected to said spindle and receiving said unbalance signal for producing a resultant mean signal determinative of the angular disposition of unbalance of said rotary member relative to said spindle, a marking device disposed adjacent said rotary member, secondary drive means operatively connected to said integrating means and responsive to said determinative resultant signal for subsequently repositioning the unbalanced portion of said rotary member relative to said marking device, and means for actuating said marking device for marking said member at the corrective location repositioned adjacent thereto by said secondary drive means.

5. A balancing machine including means for supporting and rotating an unbalanced member, a pick-up device operatively connected to said first-named means for detecting the unbalance of said member and producing an unbalance signal, means operatively connected to said rotating means for producing a reference signal, means operatively connected to said pick-up device for commutating said unbalance signal and receptive of said reference signal for combination therewith to produce a resultant mean signal, servo control means responsive to said resultant signal for adjusting said commutating means for reducing said resultant signal and determining the disposition of the unbalanced portion of said member, a marker device provided upon said machine and disposed adjacent said unbalance member, and means operatively connected to said servo control means for positioning the corrective portion of said unbalance member adjacent said marker device having reference to the setting of said commutating means producing a zero resultant signal, said marker device being adapted to engage the corrective portion of said member when disposed adjacent thereto.

6. A balancing machine including a drive spindle for supporting a vehicle wheel for rotation, means for rotating said spindle, an unbalance detector operatively connected to said spindle and adapted to generate an unbalance signal in response to any unbalance of said vehicle wheel, means operatively connected to said spindle for generating a reference signal having a wave length equal to that of said unbalance signal, said means including a split slip ring rotatable with said spindle and brushes separately movable with respect to said slip ring, means operatively connected to said unbalance detector and said last-recited generating means for combining said reference signal to said unbalance signal and for producing a resultant signal whose mean amplitude is dependent upon the time of commutation, drive means operatively connected to said commutating means and responsive to said resultant signal for moving said brushes to change the time of commutation and reduce the mean amplitude of said resultant signal, a marker device disposed adjacent said vehicle wheel, and means operatively connected to said drive means and said spindle for repositioning said split slip ring relative to said brushes and said spindle relative to said marker device for locating said unbalance over said marker device and in position for corrective marking.

7. A vehicle wheel balancing machine including a drive spindle for supporting a vehicle wheel for rotation, spindle drive means for rotating said vehicle wheel, and unbalance detector operatively connected to said spindle and adapted to generate an unbalance signal in response to any unbalance of said vehicle wheel, means operatively connected to said spindle for generating a reference signal, means operatively connected to said unbalance detector and reference signal generating means for receiving and utilizing said reference signal to commutate said unbalance signal and to achieve a resultant direct current signal, the amplitude of said resultant signal being dependent upon the phase relation of said reference signal to said unbalance signal and the phase relation of said unbalance signal to said reference signal being indicative of the angular location of unbalance of said vehicle wheel, means operatively connected to said commutating means and to said reference signal generating means and responsive to said resultant signal for varying the phasing of said reference signal with respect to said unbalance signal for progressively reducing said resultant signal, and means operatively connected to said last-mentioned means for subsequently repositioning said spindle and said vehicle wheel in accordance with the relative phase shifting required to eliminate said resultant signal.

8. A balancing machine including means for receiving and rotating an unbalanced member, means for automatically determining the amplitude of unbalance of said member and the angular disposition of unbalance thereof relative to said first-mentioned means, means for automatically marking said member with the corrective measure required to be taken to balance said member, means operatively connected to said first-mentioned means and determinative of the relative angular disposition of said unbalanced member to said marking means upon the completion of rotation of said member, repositioning means operatively connected to said second-named means and said last-named means and automatically responsive to the angular determinations made by said second and last-named means for repositioning said member relative to said marking means, said marking means being operatively connected to said second-named means and responsive to the amplitude determination made thereby and being operatively connected to said repositioning means for actuation thereby upon the completion of the operation thereof.

9. Dynamic balancing means including means for receiving and rotating a member for balance determination and correction, means operatively connected to said first-mentioned means for automatically determining the amplitude of unbalance of said member and the relative angular relation of unbalance with respect to said first-mentioned means, means operatively connected to said determining means and automatically responsive to the amplitude determination made thereby, means operatively connected to said first-mentioned means and determinative of the relative angular relation of said first-mentioned means with respect to said amplitude responsive means, means operatively connected to both of said determinative means and automatically responsive to the summation of the angular determinations made thereby for repositioning said member relative to said amplitude responsive means, and means operatively connected to said repositioning means for automatically actuating said amplitude responsive means to engage said member upon the relocation of said member relative thereto.

References Cited in the file of this patent
UNITED STATES PATENTS

| | | |
|---|---|---|
| 2,243,379 | Johnson | May 27, 1941 |
| 2,500,013 | Svensson et al. | Mar. 7, 1950 |
| 2,636,381 | Hagg et al. | Apr. 28, 1953 |

U. S. DEPARTMENT OF COMMERCE
PATENT OFFICE

CERTIFICATE OF CORRECTION

Patent No. 2,821,858     William F. King     February 4, 1958

It is hereby certified that error appears in the printed specification of the above numbered patent requiring correction and that the said Letters Patent should read as corrected below.

Column 4, line 38, for "adapted" read -- adapter --; column 10, line 27, for "corrective" read -- amplitude responsive --.

Signed and sealed this 10th day of June 1958.

(SEAL)
Attest:
KARL H. AXLINE
Attesting Officer

ROBERT C. WATSON
Commissioner of Patents